C. E. JONES.
HEADLIGHT FOR AUTOMOBILES.
APPLICATION FILED AUG. 8, 1913.
1,110,940.
Patented Sept. 15, 1914.
2 SHEETS—SHEET 1.
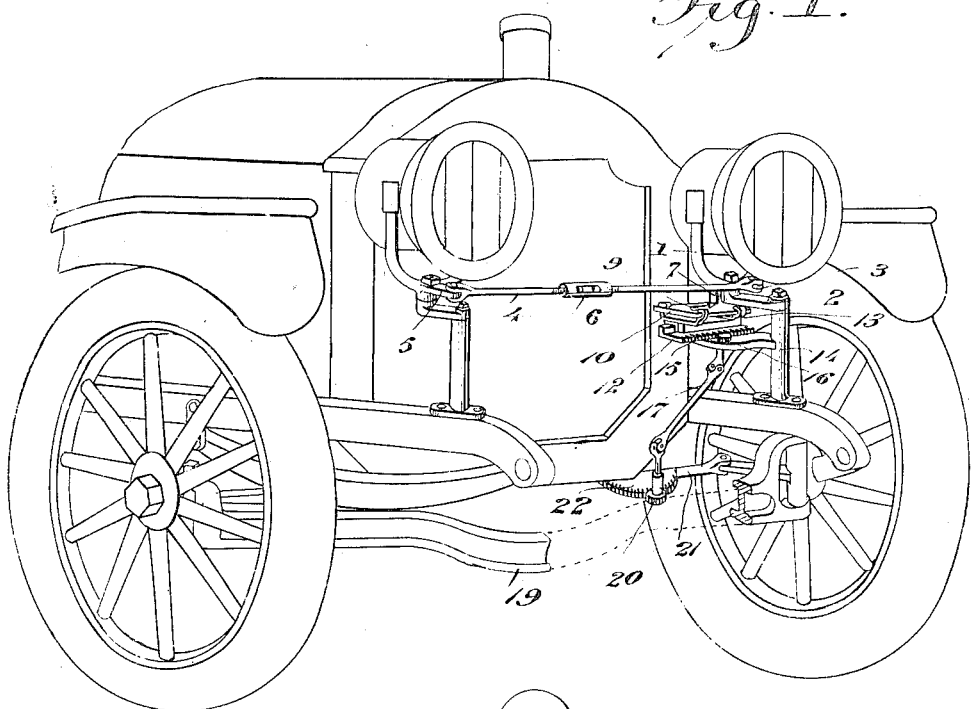
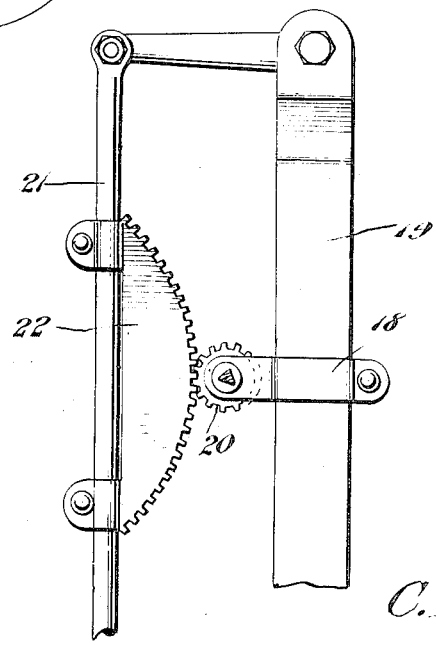

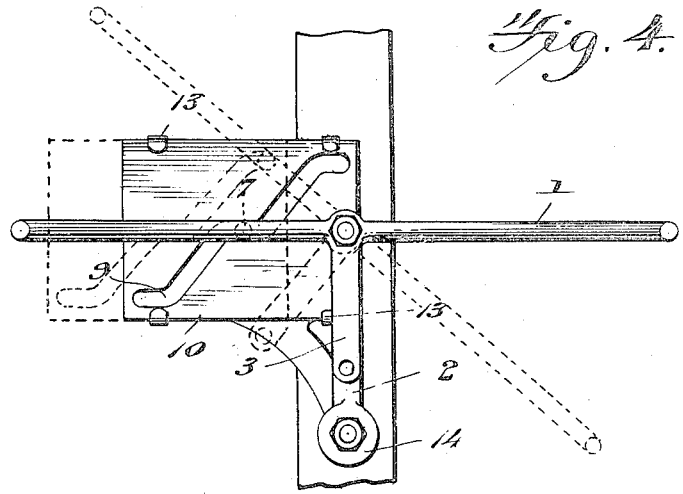
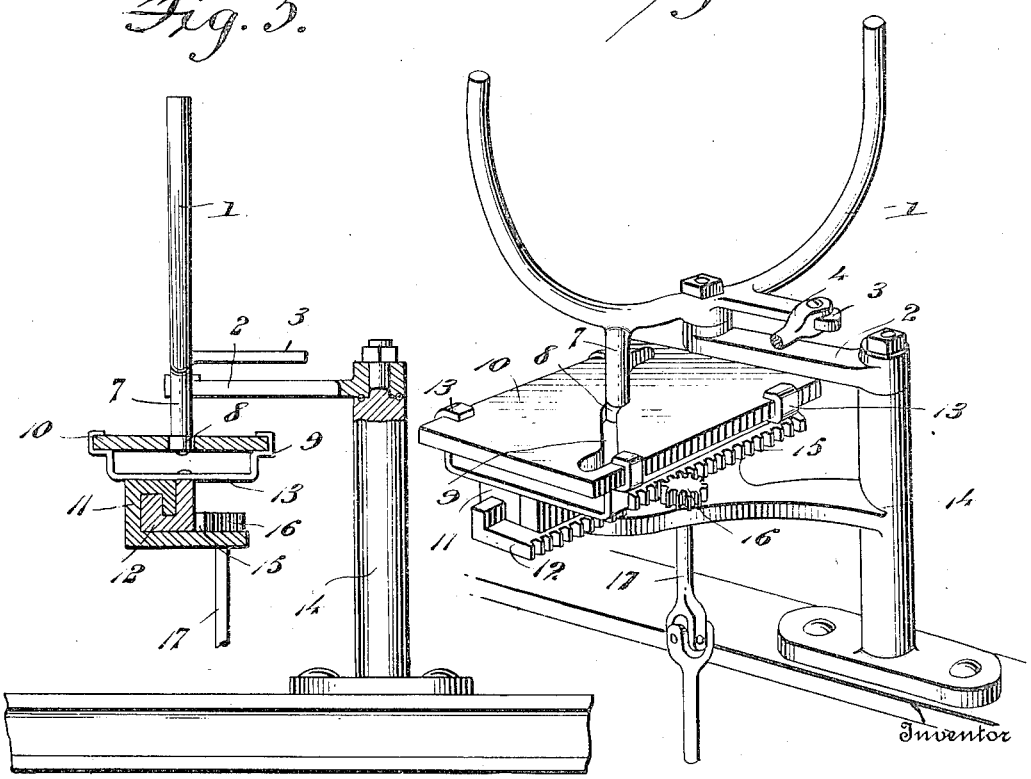

UNITED STATES PATENT OFFICE.

CHARLES E. JONES, OF SOUTH AUBURN, NEBRASKA, ASSIGNOR OF ONE-HALF TO VERNE W COONS, OF SOUTH AUBURN, NEBRASKA.

HEADLIGHT FOR AUTOMOBILES.

1,110,940.  Specification of Letters Patent.  Patented Sept. 15, 1914.

Application filed August 8, 1913.  Serial No. 783,779.

*To all whom it may concern:*

Be it known that I, CHARLES E. JONES, a citizen of the United States, residing at South Auburn, in the county of Nemaha and State of Nebraska, have invented new and useful Improvements in Headlights for Automobiles, of which the following is a specification.

The primary purpose of this invention is the provision of headlight mechanism intended chiefly for automobiles and kindred machines or vehicles so as to shed rays of light upon the roadway in advance of the machine, whether turning a corner, rounding a curve or traveling straight ahead.

The invention provides novel actuating means for turning the headlight so as to throw the beams of light upon the roadway in advance of the machine, thereby preventing a casualty either from collision or the machine running into a depression or trench at the side of the road.

The invention further provides peculiar actuating means for operating the headlight in conjunction with the steering mechanism so that movement of the steering wheels to deflect the machine from a straight course will result in a corresponding angular movement of the headlight to cause the rays of light to be thrown upon the roadway in advance of the machine to illuminate the same.

The invention consists of the novel features, details of construction and combination of parts, which hereinafter will be more particularly set forth, illustrated in the accompanying drawings, and pointed out in the appended claims.

Referring to the drawings, forming a part of the application, Figure 1 is a perspective view of the front portion of an automobile provided with headlights embodying the invention. Fig. 2 is a detail view, showing the means for transmitting motion from the steering mechanism to the lamp operating means. Fig. 3 is a detail view of one of the lamp supports, showing the mounting therefor and the lamp actuating means immediately associated with the lamp support. Fig. 4 is a top plan view of the lamp support and operating plate therefor, the dotted lines showing angular adjustments of the lamp support. Fig. 5 is a sectional view of the lamp support and operating means.

Corresponding and like parts are referred to in the following description, and indicated in all the views of the drawings, by the same reference characters.

The invention is adapted to be readily applied to the different types of automobiles and kindred machines and vehicles, it being understood that such changes as are necessary in the adaptation are contemplated within the purview of the invention. The drag link or rod connecting the arms of the steering knuckles does not always occupy the same relative position and in some makes of machines such drag link is arranged in the rear of the axle and in other makes it is located in front of the axle. The relative position of such drag link or connecting rod also necessitates mechanical changes in the installation of a headlight mechanism embodying the invention and such changes are also embodied in the scope of the invention as provided for in the appended claims.

The lamp support consists of a fork 1, which is mounted upon one end of an arm 2, which latter is supported at its opposite end to turn about a vertical axis. The fork or lamp support 1 is journaled to the swinging end of the arm 2 in any manner to admit of the parts turning freely. It is to be understood that the antifriction bearings of any make are interposed between the moving parts to insure their ease of movement. An arm 3 projects from the fork or lamp support and turns therewith. A rod 4 connects the arm 3 of the lamp support upon one side of the machine or vehicle with an arm 5 projecting from the lamp support at the opposite side of the machine, thereby causing both lamps to move in unison.

The rod 4 is adapted to make adjustable connection with the arms 3 and 5 and in turn is adapted to be lengthened or shortened to admit of properly positioning the lamps and for this purpose such rod 4 is provided in its length with a turnbuckle 6. A projection 7 is pendent from a member of the fork 1 and may form a part of such fork or be attached thereto. The projection 7 terminates at its lower end in a stud upon which is mounted a roller 8, the latter being arranged to operate in a tortuous or zigzag guide or slot 9 formed in a plate 10, whereby a sliding movement of such plate produces a turning of the fork or lamp support to cause the lamp to turn with the steering wheels and occupy approximately a like angular position so as to throw the light ahead of the machine when turning a corner, rounding a curve, or moving straight ahead. The guide or slot 9 extends through the plate 10, thereby admitting of such plate being reversed to be used on either side of the machine as may be required. The guide 9 extends diagonally across the plate 10 and its middle and end portions are parallel, whereas the intermediate portions are inclined. The end portions of the guide or slot extend in opposite directions from the intermediate portion and are of similar formation, the purpose being that when the plate is moved in one direction from a neutral position the headlight is turning to one angle and when such plate 10 is moved in the opposite direction the headlight is moved to a reverse angular position, the construction being such as to cause the lamp to turn either to the right or to the left in accordance with the turning of the machine either to the right or to the left.

A guide 11 is conveniently positioned with reference to the lamp support and parts of the machine and receives a slide 12, which is mounted upon such guide to move freely. Cross pieces 13 are connected to the slide 12 to move therewith and are likewise secured to the plate 10 in a manner to admit of such plate being detached and reversed. The guide 11 is connected with a standard 14, the latter also supporting the arm 2. The slide 12 has a toothed portion 15, which is in mesh with the teeth of a pinion 16 fast to the upper end of a shaft 17, by means of which motion is transmitted from the steering mechanism to the slide. The shaft 17 may be of any type, admitting of its parts being out of line, which is essential in order to admit of readily adapting the invention to the various types of vehicles and machines provided with headlights.

A bearing 18 is clipped or otherwise secured to the front axle 19 and receives a pinion 20, which is mounted to turn freely in such bearing, but which is prevented from vertical movement. The lower portion of the shaft 19 is connected with the pinion 20 and in the event of the shaft being in the nature of a tumbling rod the lowermost section is made non-circular in cross section and is slidable in an opening of corresponding form provided in the pinion 20, thereby making provision for the action of the vehicle springs without disabling the means whereby motion is transmitted from the steering mechanism to the headlights. The drag link or rod 21, which unites the arms of the steering knuckles is provided with a toothed segment 22, which is in mesh with the pinion 20, whereby the latter is rotated when the drag link 21 is moved in the steering of the machine.

When the invention is applied to the headlights of an automobile or other vehicle or machine the lamp faces straight ahead when the steering wheels are in line with the machine and the roller 8 occupies the middle position of the guide or slot 9 and the toothed segment 22 is in position with its middle portion opposite the pinion 20. When the steering wheels are turned to the right the lamps likewise turn to the right by reason of the intermediate connections and when the steering wheels are drawn to the left the lamps likewise turn to the left to throw the light so as to illuminate the road in advance of the machine.

From the foregoing description, taken in connection with the accompanying drawings, the advantages of the construction and of the method of operation will be readily apparent to those skilled in the art to which the invention appertains, and while I have described the principle of operation of the invention, together with the device which I now consider to be the best embodiment thereof, I desire to have it understood that the device shown is merely illustrative, and that such changes may be made when desired as are within the scope of the claims appended hereto.

Having thus described the invention what is claimed as new, is:

1. In a vehicle headlight mechanism the combination of a lamp support, a plate having a guide of zigzag form with its end portions of similar formation and inclining in opposite directions from a medial point, means projecting from the lamp support and entering the guide of the plate, and means for imparting a sliding movement to the plate to effect angular adjustment of the lamp support in each direction.

2. In headlight mechanism for automobiles and kindred machines and vehicles the combination of a lamp support having a projection, a plate having a slot of zigzag form with its end portions of similar construction and oppositely inclined from a medial point, said plate being reversible and adapted to have the projection of the lamp support arranged to operate in the slot thereof, and means for imparting a sliding movement to the plate to effect angular adjustment.

3. In vehicle headlight mechanism the combination of a lamp support, a pivoted arm having the lamp support mounted upon its free end, a plate provided with a guide of substantially zigzag form and having its end portions of similar outline, a slide having the plate connected therewith, a guide receiving the slide and directing the same in its reciprocating movements, and connecting means between the slide and steering mechanism to impart a reciprocating movement to such slide.

In testimony whereof I affix my signature in presence of two witnesses.

CHARLES E. JONES.

Witnesses:
K. H. WEST,
A. C. VAN HORNE.